ABSTRACT OF THE DISCLOSURE

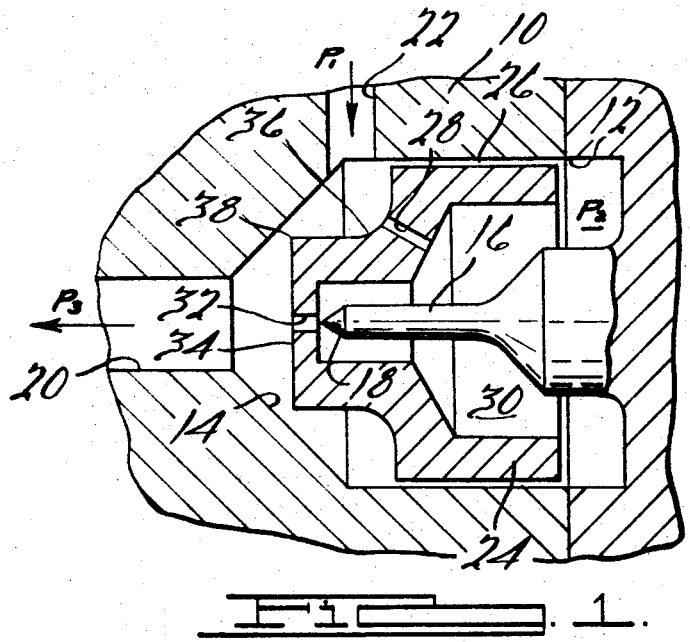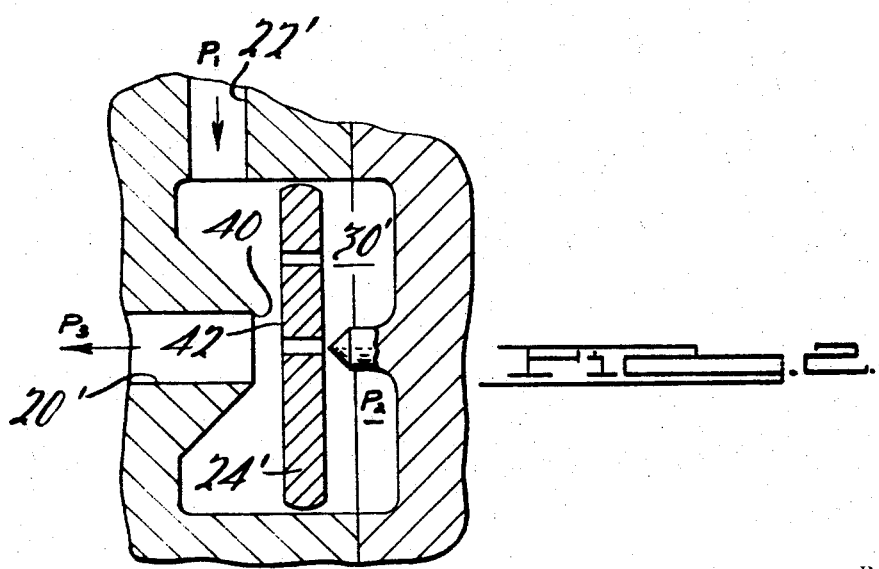

This specification discloses a fluid flow orifice assembly that maintains a controlled flow from a fluid inlet port to a fluid flow outlet port that may be either constant or variable with a precalibrated flow characteristic regardless of changes in viscosity of the fluid. For any given pressure differential between the ports, the flow remains at the controlled rate. Compensation for changes in viscosity is effected by a movable valve element that shifts to increase the effective flow area as the viscosity of the fluid increases and to decrease the effective flow area when the viscosity decreases. The response of the movable element is determined solely by changes in viscosity, not by other design variables.

*General description of the invention*

My invention is related generally to fluid flow systems that require a controlled rate of flow from a pressure source to pressure actuated control regions of the system or to regions of the system that are sensitive to changes in flow volume. The controlled rate of flow must be maintained regardless of changes in viscosity due to changes in temperature of the fluid.

It is an object of my invention to provide a flow control orifice assembly that will maintain a constant rate of flow for any given pressure drop from the inlet side of the orifice assembly to its outlet side. I have achieved this objective by providing a flow path of varying area as the fluid passes through the orifice assembly. The varying area is obtained by means of a movable orifice element that registers with a relatively fixed element with a valve opening. When the valve element is in close proximity to the fixed element, a relatively small flow area is made available to the fluid through the opening.

The movable element is provided with one or more orifices of fixed size so that pressure is produced on one side thereof. That pressure is of a value intermediate the inlet pressure of the fluid and the outlet pressure. The opposite side of the movable element is exposed to a higher pressure at the inlet side of the orifice assembly and to a lower pressure at the outlet region. Each of these latter pressures acts on a separate area of the movable element. When the assembly is in a steady-state condition, the intermediate pressure acting on one side of the movable element balances the sum of the pressure forces acting on the other side.

One side of the movable element is in fluid communication with the outlet side of the assembly through a variable-size orifice. This orifice comprises a fixed opening in the movable element which registers with a metering element carried by a relatively stationary portion. Adjustment of the movable element then will vary the effective flow area of the variable-size orifice. Thus, the magnitude of the intermediate pressure at one side of the movable element will depend upon the position of the movable element with respect to the fixed metering element. The adjustment of the movable element in turn depends upon a change in the pressure drop across the fixed orifice.

As the movable element adjusts itself to establish equilibrium, an increase in the flow area takes place as the viscosity of the fluid increases and the pressure drop across the fixed orifice increases. Conversely, the effective flow area of the assembly decreases as the viscosity of the fluid decreases.

*Brief description of the figures of the drawings*

FIGURE 1 shows in cross-sectional assembly form my improved metering orifice assembly; and FIGURE 2 shows an alternate embodiment of my invention as seen in a cross-sectional view similar to that of FIGURE 1.

*Particular description of the invention*

In FIGURE 1 numeral 10 designates an orifice valve body which may be considered to be relatively stationary. Formed in the body 10 is a circular opening of generally cylindrical form as shown at 12. The left-hand end of the opening 12 is conical in form to provide a conical valve seat 14. The right-hand side of the opening 12 is connected to or is formed integrally with a metering element 16 having a flow metering nose portion 18. The portion 18 is situated generally on the geometric axis of the opening 12.

A flow outlet port 20 communicates with the opening 12 at a central location on the left side thereof. A flow inlet port 22 communicates with the opening 12 at a side location, as indicated.

Situated slidably within the opening 12 is a flow metering piston element 24. It is generally cylindrical in form so that it registers with the opening 12. The clearance between the piston 24 and the opening 12 is sufficient, however, to provide an effective flow orifice 26 extending from the left-hand side of the element 24 to its right-hand side. In addition, a second fixed-size orifice 28 extends from the left-hand side of the element 24 to the right-hand side thereof. This orifice is intended for convenience in calibration of the assembly. The element 24 cooperates with the right-hand side of the valve body to provide a pressure chamber 30. The central part of the element 24 is provided with flow orifice 32 which connects the chamber 30 with the port 20.

The element 24 is provided with two pressure areas on its left-hand side, as shown at 34 and 36. The pressure in port 22 acts on the area 36 and the pressure in port 20 acts on the area 34. Area 34 is separated from area 36 by the edge 38 of the element 24.

During normal operation of the orifice assembly fluid flows from port 22 to port 20. As it does this it passes between the edge 38 and the valve seat 14. The restriction provided by the annular opening between the edge 38 and the seat 14 creates a pressure drop so that the pressure $P_3$ in port 20 is less than the pressure $P_1$ in port 22. The pressure in $P_1$ creates a flow through orifice 28 and also through orifice 26 thereby creating a pressure $P_2$ in chamber 30.

The effective area of the element 24 over which the pressure $P_2$ acts being greater than the effective pressure area of pressure $P_1$, the pressure force thus established by pressure $P_2$ opposes and balances the pressure forces established by the pressure $P_1$ acting on the area 36 and the pressure $P_3$ acting on the area 34. If the viscosity of the fluid remains constant, this equilibrium condition will be maintained, and the flow from port 22 to port 20 will remain constant.

If it is assumed now that the viscosity of fluid increases for some reason, a tendency will exist for the flow through orifices 28 and 26 to decrease. This will result in a reduction in the pressure $P_2$ in the chamber 30.

Fluid in the chamber 30 normally flows through orifice 32 to the exhaust port 20. A decrease in the flow through the orifices 28 and 26 then will tend to upset the flow equilibrium, and the flow through orifice 32 then will tend to decrease. The pressure $P_1$ and the pressure $P_3$ will create pressure forces on the left-hand side of the element 24 which, when added, exceed momentarily the pressure force created by the pressure $P_2$ acting on the right-hand side of the element 24. This tends to shift the element 24 so that metering element 16 will move into closer registry with the orifice 32. This will decrease the rate of flow through the orifice 32 so that that flow will correspond to the sum of the flow through each of the orifices 28 and 26. This will restore the pressure $P_2$ to its original value.

The newly adjusted position of the element 24 necessary to achieve this balanced equilibrium condition will result in displacement of the edge 38 away from the valve seat 14, thereby increasing the effective flow area between port 22 and port 20. This flow area increase will compensate for the increased viscosity of the fluid so that regardless of changes in the viscosity, the flow through the assembly will remain constant.

On the other hand, if the viscosity should decrease, adjustment of the element 24 in the opposite direction will occur thereby moving the edge 38 closer to the conical valve seat 14 to restrict the flow area. As it does this, the flow will remain constant even though the viscosity of the fluid should decrease.

The diameter of the area 36 and the diameter on the right side of element 24, as well as the size of the various orifices, can be adjusted as desired in order to calibrate the assembly and provide the desired characteristics for any given application.

In the embodiment of FIGURE 2, the function of the elements is the same as that described with reference to FIGURE 1. The configuration of the flow orifices, however, are different. In the case of FIGURE 2, the valve seat 14 has been replaced by a sharp-edge valve seat 40, which is situated in close proximity to one side 42 of movable element 24'. In other respects the embodiment of FIGURE 2 is similar to that of FIGURE 1 and the common elements have been indicated by common reference characters, although prime notations have been added. The controlled flow area in the FIGURE 2 construction, as flow passes from port 22' to port 20', is the annular space between the side 42 of the element 24' and the edge 40. The effective area of the element 24' over which the outlet pressure acts is equal to the area of the port itself. The effective area of the element 24' over which the inlet pressure $P_1$ acts is equal to the area on the left side of element 24 minus the area with edge 40. The sum of the pressure forces established by pressure $P_1$ and $P_3$ is equal to the pressure $P_2$ in chamber 30' times the area on the right side of element 24'.

If some flow characteristic other than a constant flow characteristic is desired, nose portion 18 of the metering element 16 in the FIGURE 1 environment or the corresponding metering element of FIGURE 2 may be modified to produce a non-linear profile.

Having thus described preferred forms of my invention, what I claim and desire to secure by U.S. Letters Patent is:

1. A fluid flow control orifice assembly comprising a valve body, a valve opening in said body, a flow inlet port and a flow outlet port communicating with said opening at spaced locations, a movable valve element in said opening, one side of said opening and said valve element cooperating to define a first pressure chamber, a valve seat surrounding said outlet port, said movable valve element being adapted to register with said valve seat in close proximity thereto to establish an effective fluid flow path connecting said inlet port and said outlet port through said opening on the other side of said movable element, a first pressure area on said other side of said movable element being subjected to the pressure in said inlet port, another pressure area on said other side of said movable valve element being subjected to the pressure in said outlet port, a fixed capacity flow orifice connecting the pressure chamber on said one side of said movable element and said inlet port, a variable flow orifice connecting said pressure chamber on said one side and said outlet port including a flow restricting opening in said movable element and a metering element connected to said valve body, said metering element registering with said flow restricting opening to form a variable capacity flow path to said outlet port, a change in viscosity of fluid passing through said assembly being accompanied by adjustment of said movable element to effect a change in the effective flow area between said ports thereby tending maintaining a constant flow through said assembly regardless of changes in viscosity.

2. The combination as set forth in claim 1 wherein said outlet port is centrally located at one end of said chamber, a valve seat of regular geometric form surrounding said outlet port, a flow metering edge on said movable element adapted to register with said seat in close proximity thereto thereby providing a variable capacity fluid flow path.

3. The combination as set forth in claim 1 wherein the fixed capacity flow orifice that extends from said inlet port comprises a clearance area between said movable element and the surrounding wall of said chamber.

4. The combination as set forth in claim 2 wherein the fixed capacity orifice that extends from said inlet port comprises a clearance area between said movable element and the surrounding wall of said chamber.

5. The combination as set forth in claim 1 wherein the fixed capacity orifice comprises a fixed opening in said movable element at the area on said movable element on which the pressure in said inlet port acts, and a second flow area defined by the space between the periphery of said movable element and the surrounding wall of said chamber body.

6. The combination as set forth in claim 2 wherein the fixed capacity orifice comprises a fixed opening in said movable element at the area on said movable element on which the pressure in said inlet port acts, and a second flow area defined by the space between the periphery of said movable element and the surrounding wall of said opening in said valve body.

References Cited

UNITED STATES PATENTS

| | | | |
|---|---|---|---|
| 2,198,487 | 4/1940 | Sisk | 137—504 |
| 2,657,707 | 11/1953 | McGinn | 137—504 |
| 2,950,733 | 8/1960 | Perkins | 137—504 XR |

HAROLD W. WEAKLEY, *Primary Examiner.*

U.S. Cl. X.R.

137—508